United States Patent [19]

Smith-Williams et al.

[11] 4,415,182
[45] Nov. 15, 1983

[54] MOUNT FOR TRAILER JACK

[76] Inventors: Margie M. Smith-Williams; Robert E. Williams, both of 7929 Stewart & Gray #10, Downey, Calif. 90241

[21] Appl. No.: 414,652

[22] Filed: Sep. 2, 1982

Related U.S. Application Data

[63] Continuation-in-part of Ser. No. 228,184, Jan. 26, 1981, abandoned.

[51] Int. Cl.³ .............................. B60S 9/02; B60S 9/14; B60S 9/22
[52] U.S. Cl. ................................. 280/763.1; 248/352; 254/418; 280/475
[58] Field of Search .................... 280/475, 763.1, 766, 280/491 E, 490 R; 248/218.4, 511, 539, 121, 352; 254/418; 172/274

[56] References Cited

U.S. PATENT DOCUMENTS

| | | | |
|---|---|---|---|
| 2,238,411 | 4/1941 | Conklin | 254/86 R |
| 3,077,356 | 2/1963 | Shepherd | 280/766 |
| 3,336,051 | 8/1967 | Dale | 280/490 R |
| 3,345,037 | 10/1967 | Sweetland, Jr. | 280/475 |
| 3,945,668 | 3/1976 | Holland | 280/490 R |

FOREIGN PATENT DOCUMENTS 1070686  8/1954  France ............................... 280/475

Primary Examiner—Joseph F. Peters, Jr.
Assistant Examiner—Kenneth R. Rice
Attorney, Agent, or Firm—Keith D. Beecher

[57] ABSTRACT

A mount is provided for securing a jack to the tongue of a trailer, and the like. The mount in one embodiment includes two separate brackets, each having a gusset-like configuration; the brackets being welded or bolted to the tongue in position such that the forward edges of a pair of upright sides of each of the brackets engages the jack in essentially diametrically opposite relationship to the jack. These edges are welded to the jack, and the resulting assembly provides a rugged, rigid, strong and simple mount for the jack. In a second embodiment the mount is formed of a single piece.

9 Claims, 13 Drawing Figures

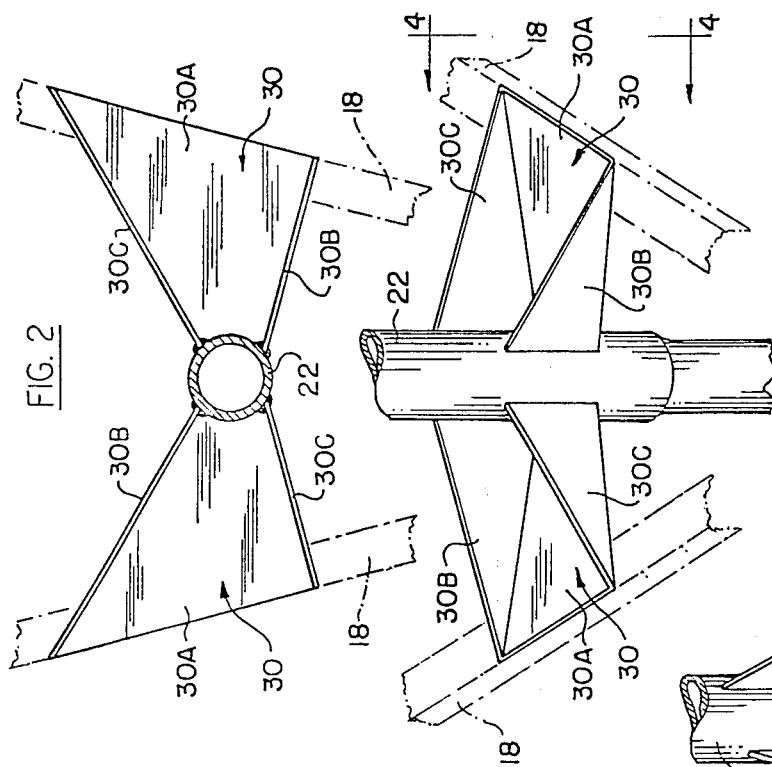
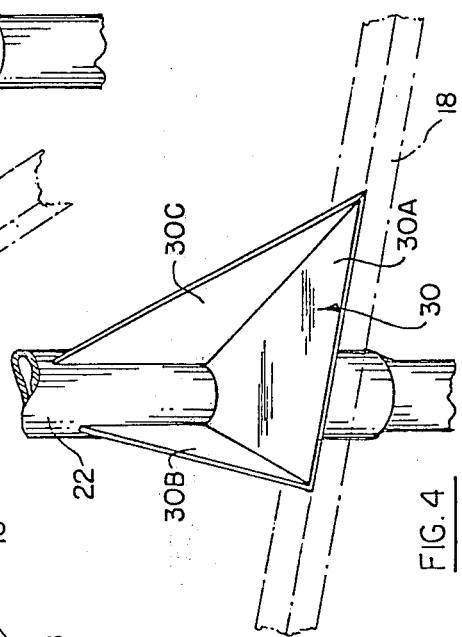
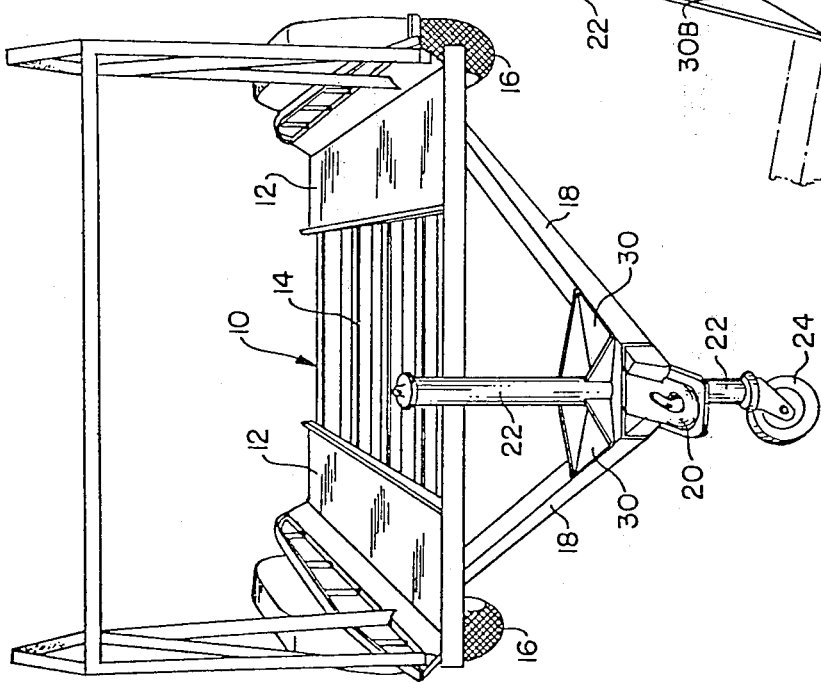

MOUNT FOR TRAILER JACK

This application is a continuation-in-part of copending application Ser. No. 228,184 filed Jan. 26, 1981, now abandoned.

BACKGROUND OF THE INVENTION

Detachable trailers, and especially trailers used for transporting heavy objects, include a load platform carried by a frame supported on rear wheels, and a forwardly extending tongue which is intended to be coupled to the towing vehicle. Such trailers often include a vertically adjustable jack mounted on the tongue for supporting the trailer with the tongue displaced up from the ground at the elevation desired for coupling the trailer to the towing vehicle. A caster wheel is sometimes provided at the lower end of the jack, so that the trailer may be moved when it is supported by the jack.

Problems have been encountered in the past in providing an adequate means for mounting the jack to the tongue. For example, side mounts have been used in the prior art, but there is a tendency for such mounts to twist with side loads. Apertured flat plates, welded to the jacks and to the tongues, have also been used in the past, but such mounts have very little strength. Gussets have also been used in the prior art in conjunction with the flat plates and, although the gussets add materially to the strength of such prior art mounts, they require an excessive amount of welding operations, and there is no guarantee of uniformity from job-to-job.

The mount of the present invention, as described briefly above, in one of its embodiments, is made up of two separate brackets which may be identical, or mirror images of one another, for ease of production and assembly. In accordance with the one embodiment of the invention, each bracket has a base or top plate with an arcuate front edge for receiving the jack, and each bracket has a pair of upturned side walls which converge from the rear edge toward the front edge of the base or top plate. The side walls each has the configuration of a right-angle triangle so that the overall mount has a gusset-like appearance.

The two brackets of the first embodiment are welded or bolted to the tongue of the trailer in diametrically opposite relationship with respect to the jack, as mentioned above, so that the jack extends through the arcuate front edges of the base or top plates. The forward edges of the side walls of the brackets are welded to the jack. In a second embodiment, a one-piece bracket is provided with a central hole for receiving the jack.

With the mount of the present invention, the jack is conveniently and securely attached to the frame entirely from the top, by simple welds between the brackets and the jack, or by sliding the jack through the central hole of the second embodiment, and by simple welds or bolts between the brackets and the tongue framework. The brackets provide substantial fore and aft and transverse strength, and the jack is firmly held in all directions against bending and/or twisting.

BRIEF DESCRIPTION OF THE DRAWINGS

FIG. 1 is a perspective representation of a typical trailer having a jack mounted on its tongue by means of a mount which incorporates the concepts of one embodiment of the invention;

FIG. 2 is a top view of the mount and jack of FIG. 1;

FIG. 3 is a front view of the mount and the jack of FIG. 1;

FIG. 4 is a side view of the mount and the jack of FIG. 1;

DETAILED DESCRIPTION OF THE ILLUSTRATED EMBODIMENTS

Figure 5:
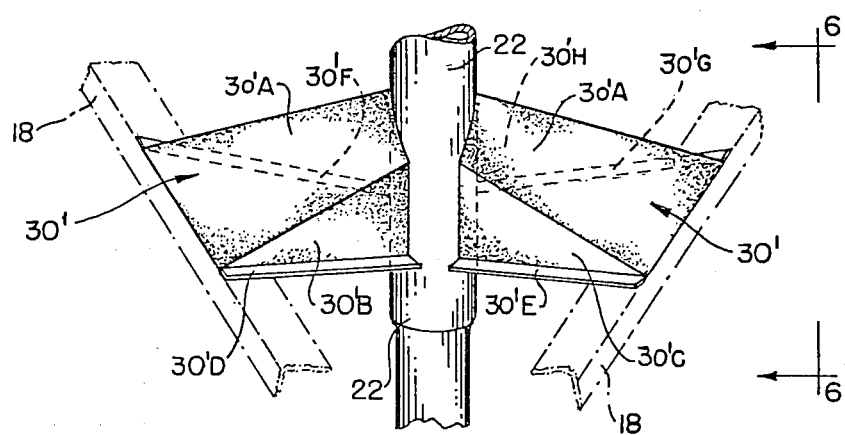
FIG. 5 is a perspective view of a second embodiment of the mount in which the brackets which make up the mount are upside down with respect to the embodiment of FIGS. 1-4.
Figure 6:
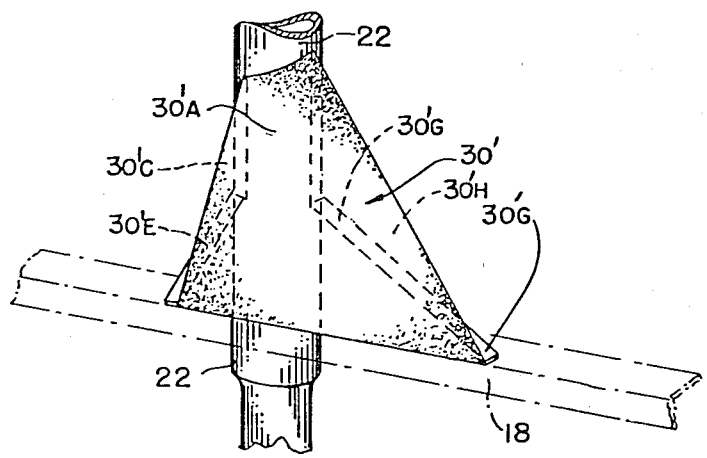
FIG. 6 is a side view of the jack and mount of FIG. 5.

As shown in FIG. 1, a trailer 10 includes a load platform 12, which is carried by a frame 14 and which is supported on wheels 16. The frame includes a forwardly extending A-shaped tongue 18 which serves to couple the trailer to a towing vehicle by means of a typical coupling 20. A vertically adjustable jack 22 is mounted on the forward end of tongue 18, the jack having a tubular housing, as shown. A caster 24 is mounted on the lower end of the jack.

As shown in FIGS. 1-4 of the drawings, jack 22 is secured to the framework of tongue 18 by a pair of brackets 30 which, as shown, are mirror images of one another. Each of the brackets 30 in FIGS. 1-4 has a base plate 30A, and a pair of side walls 30B and 30C. The side walls, as shown, converge from the rear edge of the base plate toward the forward edge. The forward edge of the base plate has an arcuate shape, to receive the housing of jack 22. The base plates of the brackets are welded to the tongue 18, and the forward edges of the base plates and of the side walls are welded to the housing of jack 22.

A second embodiment of the invention is shown in FIG. 5. The mount of FIG. 5 includes two brackets 30' which are similar to brackets 30, but which may be provided with flanges 30'D and 30'E at the edges of their side walls 30'B and 30'C. The brackets 30' are mounted upside down with respect to the brackets of the previous embodiment, so that the base plates 30A become top plates 30'A. The brackets 30' are welded to the tongue 18 by welds at flanges 30'D and 30'E and the forward edges of top plates 30'A and of the side walls 30'B and 30'C are welded to the jack 22.

Figure 8:
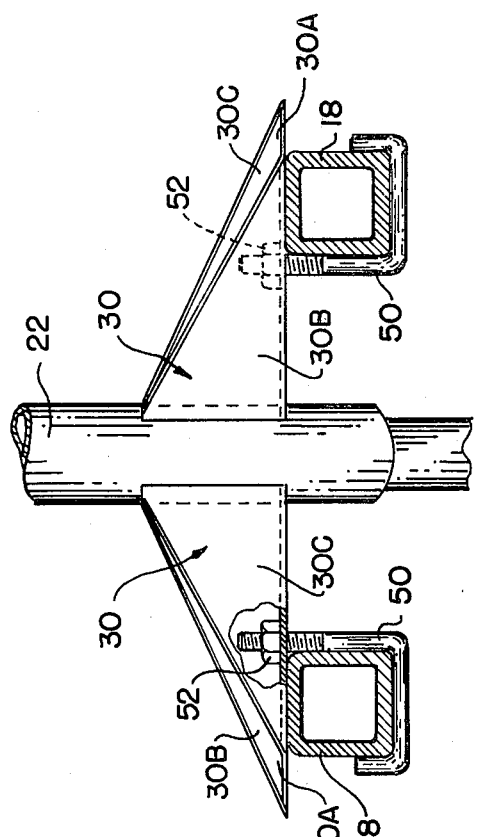
FIG. 8 is an elevational view of the brackets of FIG. 7 and associated J-bolts.
Figure 7:
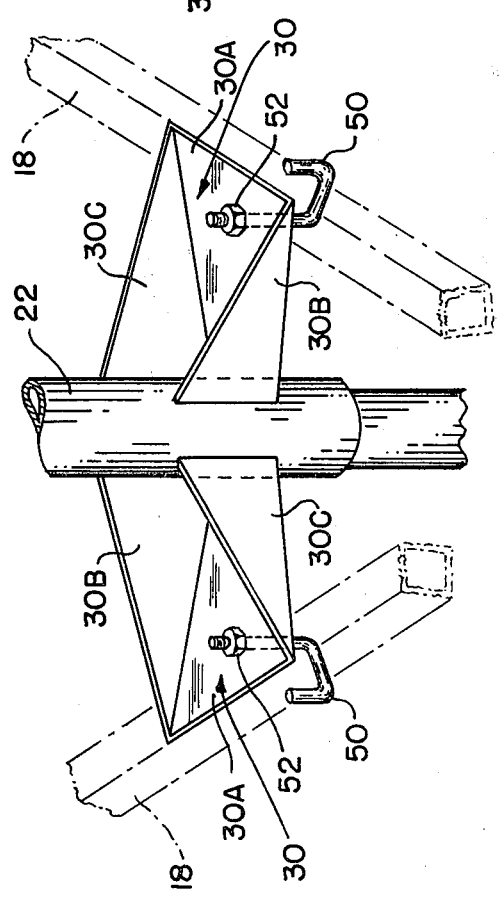
FIG. 7 is a view, like FIG. 3, but with the brackets bolted to the tongue.

In the embodiments of FIGS. 7 and 8, brackets 30 are bolted to the tongue by J-bolts 50 and nuts 52, to preclude any need to weld the brackets to the trailer tongue. This construction permits the sale of jacks with brackets welded thereto, which can be mounted by the customer on his trailer without any need for welding equipment.

Figure 10:
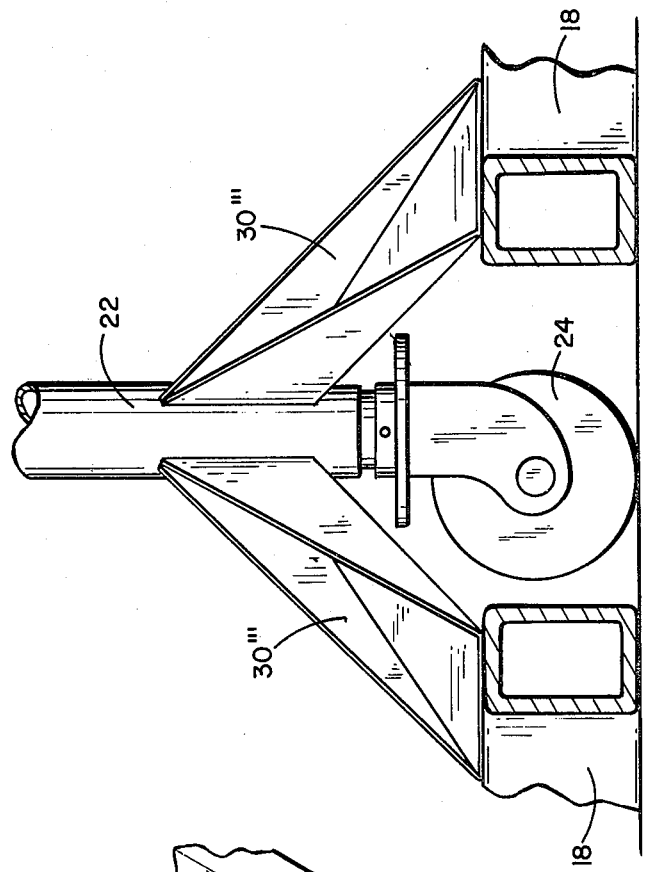
FIGS. 9 and 10 are perspective views of further embodiments in which the brackets are configured to support the jack in an upwardly displaced position so that the caster wheel may remain in place when the trailer is being towed without dragging on the ground.
Figure 9:
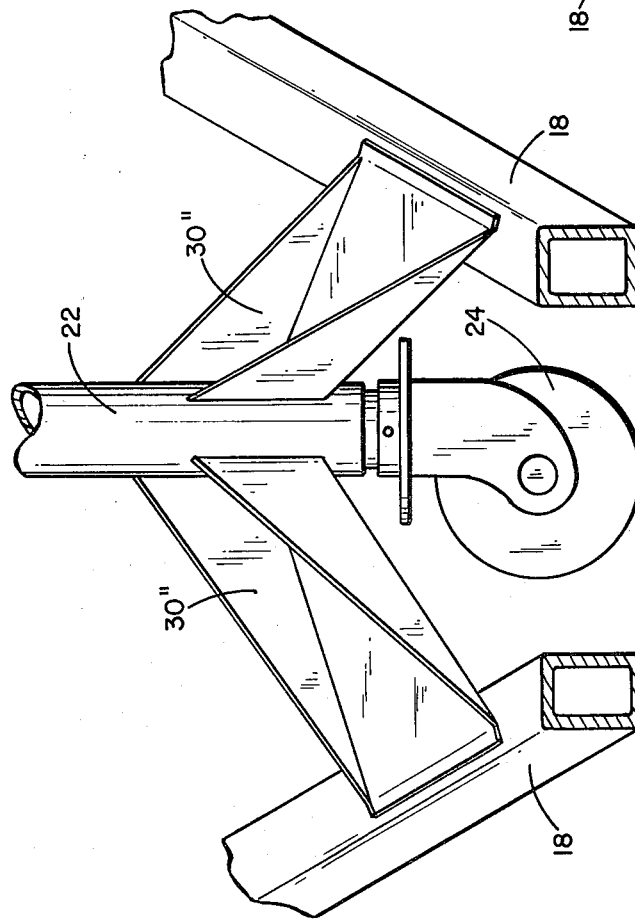

In the embodiments of FIGS. 9 and 10, the brackets 30" and 30'" are shaped so that the jack 22 is displaced upwardly to its position in the previous embodiments.

By using the brackets 30″ and 30‴ the bottom of caster 24 is level with the bottom of the tongue framework when the jack is in its retracted position. This means that the caster will not drag when the trailer is being towed, and there is no need to remove the caster for towing purposes.

Figure 12:
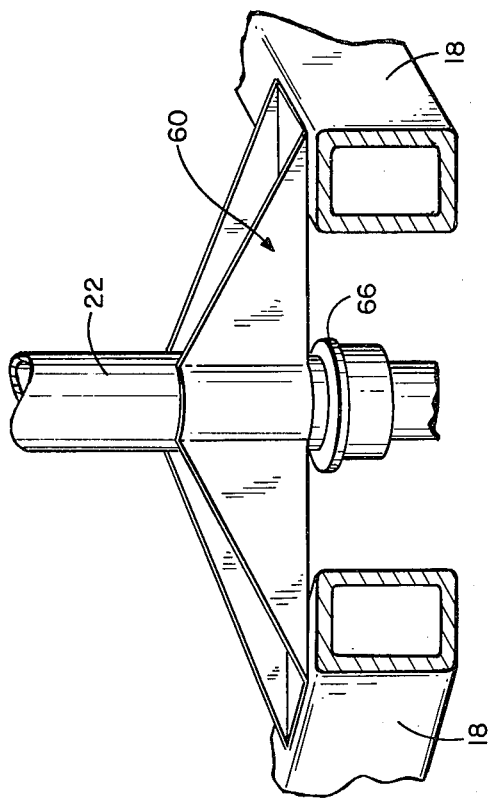
FIGS. 11, 12 and 13 are respective perspective, elevation and plan views of a one-piece mount in accordance with yet another embodiment of the invention, the plan view showing the mount prior to being formed.
Figure 13:
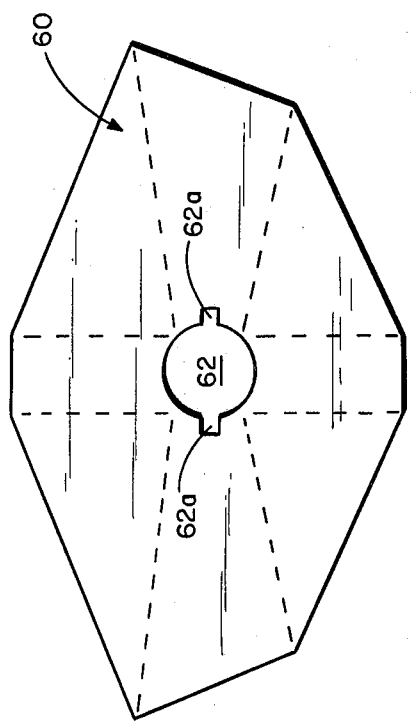
Figure 11:
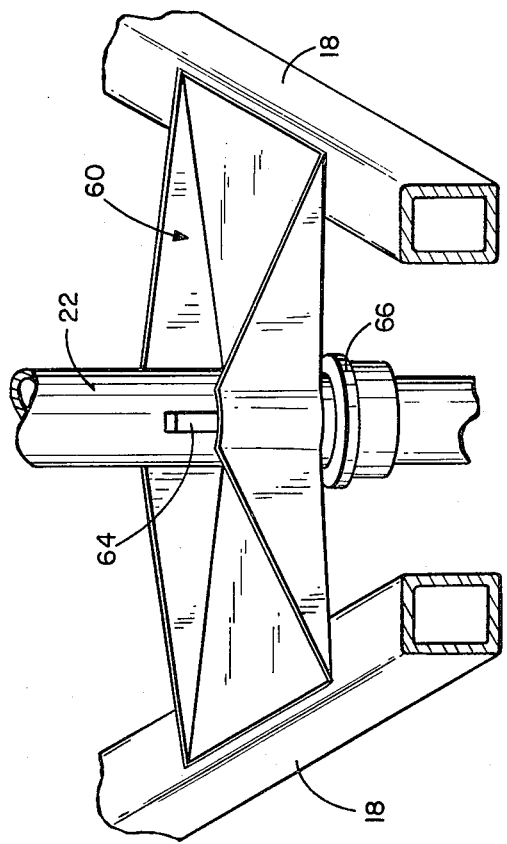

In the embodiment of FIGS. 11, 12 and 13, the mount is formed by a single bracket 60. FIG. 13 shows the bracket 60 prior to being formed.

A central hole 62 is provided in the bracket 60 for receiving the jack 22. Tabs 64 are welded to or formed into the body of the jack 22 which are received in slots 62A to allow the jack to be slid into place and then prevent downward movement when in place. A ring 66 is welded to the jack to serve as a stop, and load carrier. The jack can be removed from the mount by twisting the jack and aligning tabs 64 with slots 62A and sliding it out the bottom. The jack can be slid in from the top with the appropriate change of tab and slot design. If the "ring" is placed on the top, it can be formed of hard rubber or other materials.

The invention provides, therefore, a simple mount which comprises, for example, either a pair of brackets which may be simply and inexpensively fabricated, or may be a one-piece construction. The mount may be welded to the jack housing, and it may be mounted on the framework of the tongue of the trailer by simple welding or bolting operations which are performed entirely from the top of the trailer. The resulting mount has a gusset-like configuration, and provides a strong support for the jack from all directions.

It will be appreciated that while particular embodiments of the invention have been shown and described, modifications may be made, and it is intended in the claims to cover all modifications which come within the true spirit and scope of the invention.

What is claimed is:

1. In a trailer which includes a forwardly extending tongue for coupling the trailer to a towing vehicle, and which includes a vertically adjustable jack having an elongated tubular housing extending through the tongue; a mounting for the jack comprising bracket means having first and second bracket sections mounted on the tongue and engaging the tubular jack housing in essentially diametrically opposite relationship with respect to the jack housing; each of the bracket sections having a truncated triangular-shaped plate forming a bottom therefor with an arcuate forward edge for receiving the jack housing, and each bracket section having a pair of integral turned-up side walls on opposite side edges of said plate extending upwardly from the plane of the tongue at right angles to said plate, with the forward edge of each of the side walls engaging and extending along the jack housing.

2. The combination defined in claim 1, in which said bracket sections are separate and distinct brackets.

3. The combination defined in claim 2, in which the distinct brackets are secured to the jack housing by welds at the forward edges of said plate and of said side walls.

4. The combination defined in claim 2, in which the distinct brackets are mirror images of one another.

5. The combination defined in claim 1, in which each of the bracket sections is secured to the tongue by welds extending between the tongue and the plate.

6. The combination defined in claim 1, in which said jack includes a caster mounted on the lower end of said tubular housing, in which said plate of each of said bracket sections is inclined upwardly with respect to the plane of said yoke, and said bracket sections are configured so that the bottom of the caster is level with the bottom of the tongue when the jack is in its retracted position.

7. The combination defined in claim 1, in which said plate of each of the bracket sections is secured to the tongue by J-shaped bolts extending through the respective plates and in clamping engagement with the tongue.

8. The combination defined in claim 1, in which said mounting is formed of a single member having a central aperture for receiving the jack housing, and said bracket sections are integral with one another.

9. The combination defined in claim 8, in which said jack housing is removably mounted in said mounting.

* * * * *